United States Patent
Peterka et al.

(10) Patent No.: US 7,487,534 B1
(45) Date of Patent: Feb. 3, 2009

(54) APPLICATION PROGRAMMING INTERFACE (API) FOR ACCESSING AND MANAGING RESOURCES IN DIGITAL TELEVISION RECEIVER

(75) Inventors: Petr Peterka, San Diego, CA (US); Branislav N. Meandzija, La Jolla, CA (US); Geetha Mangalore, San Diego, CA (US); Kurt Zaiser, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/830,754

(22) PCT Filed: Oct. 7, 1999

(86) PCT No.: PCT/US99/23358
§ 371 (c)(1),
(2), (4) Date: Apr. 30, 2001

(87) PCT Pub. No.: WO00/30346
PCT Pub. Date: May 25, 2000

Related U.S. Application Data

(60) Provisional application No. 60/107,962, filed on Nov. 12, 1998.

(51) Int. Cl.
*H04N 7/173* (2006.01)
*H04N 7/16* (2006.01)

(52) U.S. Cl. .................. 725/131; 725/132; 725/133; 725/141

(58) Field of Classification Search ......... 725/131–133, 725/1.41
See application file for complete search history.

(56) References Cited

U.S. PATENT DOCUMENTS 5,563,648 A * 10/1996 Menand et al. ............. 725/142
5,699,500 A * 12/1997 Dasgupta ..................... 714/1

(Continued)

FOREIGN PATENT DOCUMENTS

DE 196 50 515 A1 6/1998

(Continued)

OTHER PUBLICATIONS

CCIT X.731 Recommendation, ITU, Jan. 1992, entire document.*

(Continued)

*Primary Examiner*—Hunter B. Lonsberry
(74) *Attorney, Agent, or Firm*—Larry T. Cullen

(57) ABSTRACT

An application programming interface (API) for managing resources in a Digital Television (DTV) Receiver/Terminal. The API provides a uniform mechanism for gaining/controlling access to resources, managing multiple resources of the same type, and accessing the individual resource's management state and status. The resources may include, for example, a tuner, a modem, a database, a plug-in module, a cable, a software module, a network interface card, or a conditional access module. The resources are monitored and controlled either locally at the terminal, or remotely, e.g., from a head-end or an uplink. The API provides a resource package (40) for registering the available resources at the terminal, a resource state management package (30) for managing states of the resources, and a registry package (20) for storing objects that represent the resources. Resources of the same type are managed as a group.

20 Claims, 7 Drawing Sheets

U.S. PATENT DOCUMENTS

| | | | |
|---|---|---|---|
| 5,717,691 A | 2/1998 | Dighe et al. | |
| 5,742,772 A | 4/1998 | Sreenan | |
| 5,758,257 A | 5/1998 | Herz et al. | |
| 5,768,539 A | 6/1998 | Metz et al. | |
| 5,815,678 A | 9/1998 | Hoffman et al. | |
| 5,919,247 A | 7/1999 | Van Hoff et al. | |
| 6,009,274 A | 12/1999 | Fletcher et al. | |
| 6,026,405 A * | 2/2000 | Arda et al. | 707/10 |
| 6,177,931 B1 * | 1/2001 | Alexander et al. | 725/52 |
| 6,230,194 B1 | 5/2001 | Frailong et al. | |
| 6,310,949 B1 * | 10/2001 | Taylor et al. | 379/219 |
| 6,363,421 B2 * | 3/2002 | Barker et al. | 709/223 |
| 6,574,213 B1 | 6/2003 | Anandakumar et al. | |

FOREIGN PATENT DOCUMENTS

| | | |
|---|---|---|
| EP | 0 813 147 A2 | 12/1997 |
| EP | 0 817 041 A2 | 1/1998 |
| EP | 0 854 645 A2 | 7/1998 |
| EP | 0 944 257 A1 | 9/1999 |

OTHER PUBLICATIONS

ITU-T X.731 ammendment 1, ITU, Apr. 1995, entire document.*

Microsoft Computer dictionary, Microsoft Press, 1999, pp. 135, 257, 379.*

Evain, J., "*The Multimedia Home Platform*", EBU Review—Technical, BE, European, Broadcasting Union, Brussels, No. 275, Mar. 21, 1998 (7 Pages).

Rath, K., et al., "*Set-Top Box Control Software: A Key Component in Digital Video*", Philips Journal of Research, Amsterdam, vol. 50, No. 1 / Jul. 2, 1996 (15 pages).

Wall, W.E., "*An Advanced Video Platform for the Cable Industry*", Fourth International Workshop on Community Network Processing, Georgia, USA, Sep. 11, 1997 (3 Pages).

Hartwig, S. "*Softwarearchitekturen Für Interaktive Digitale Decoder*", Fernseh Und Kinotechnik, vol. 50, No. 3, Germany, Mar. 1, 1996 (11 Pages).

\* cited by examiner

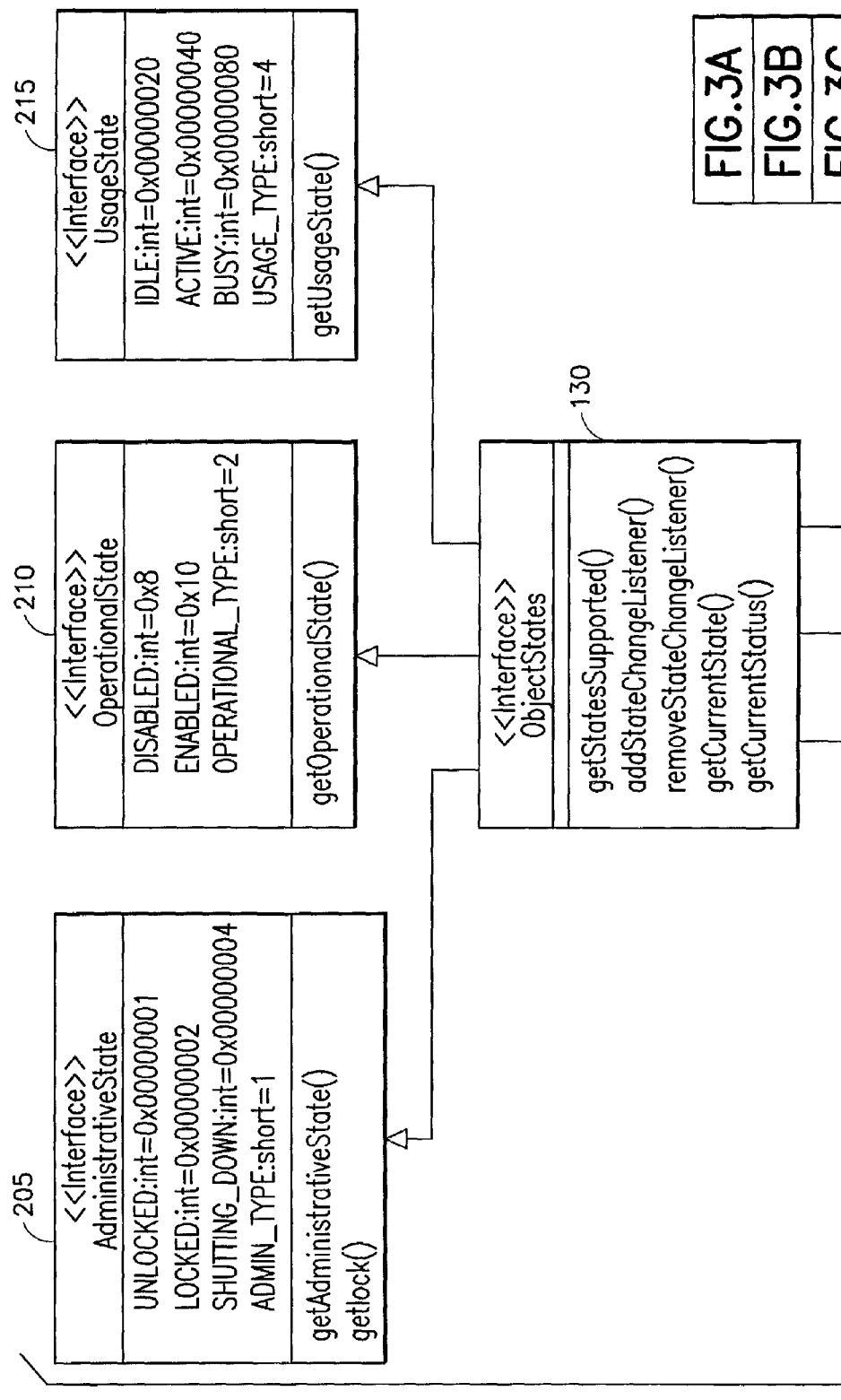

APPLICATION PROGRAMMING INTERFACE (API) FOR ACCESSING AND MANAGING RESOURCES IN DIGITAL TELEVISION RECEIVER

This application claims the benefit of U.S. Provisional Application No. 60/107,962, filed Nov. 12, 1998.

BACKGROUND OF THE INVENTION

The present invention relates to an application programming interface (API) that provides a uniform mechanism for gaining/controlling access to resources, managing multiple resources of the same type, and accessing the individual resource's management state and status. The invention is suitable for use in managing resources in a Digital Television (DTV) Receiver/Terminal.

A set-top terminal, also referred to as an Integrated Receiver-Decoder (IRD) or a subscriber terminal, is a device that receives and decodes television signals for presentation by a television. The signals can be delivered over a satellite, through a cable plant, or by means of terrestrial broadcast, for example. Various applications have been proposed, or are currently available, via modern set tops, including video on demand (VOD), audio on demand, pay-per-view, interactive shopping, electronic commerce, electronic program guides, Internet browsers, mail services (e.g., text e-mail, voice mail, audio mail, and/or video mail), telephony services, stock ticker, weather data, travel information, games, gambling, banking, shopping, voting, and others. Applications may also enable Internet connectivity and possibly Internet-based telephony. The set top functionality is enabled through specialized hardware and software.

The applications may be downloaded by terminals via a network, loaded locally (e.g., via a smart card), or installed at the time of manufacture, for example.

Moreover, with the increasing integration of computer networks such as the Internet, telephony networks, and broadband distribution networks, many opportunities arise for providing new types of applications.

However, in the new paradigm of broadcasting downloadable applications to television receivers, there is no deterministic way of predicting which applications will be running at what time, and possibly in parallel with other applications. Nonetheless, such applications must co-exist on the receiver and co-operate in such a manner that the end user has a positive experience while these applications compete for resources. For example, the applications should run without noticeable delays or interruptions.

Also, since there are only limited resources on the terminal, there is a need to monitor and control these resources, either locally or remotely from a head-end or an uplink. Such a monitoring and control mechanism should provide improved control of the receivers in the network, and should also have the capability to prevent or fix problems related to resources on the receiver.

It would be desirable to provide a mechanism for accessing and managing resources that addresses the above issues. Preferably, the mechanism should be implementable in an API.

The API should be compatible with Java™, ActiveX™ or an equivalent type of component based object-oriented technology.

The API should be compatible with Digital Audio Visual Council (DAVIC), American Television Standards Committee (ATSC) T3/S17 Digital TV Application Software Environment (DASE), Digital Video Broadcast (DVB))—MultiMedia Home Platform (MHP), and other related environments.

The system should be compatible with the ITU-T X.731 standard for state management.

The present invention provides a system having the above and other advantages.

SUMMARY OF THE INVENTION

The present invention provides an application programming interface (API) for a television terminal that provides a uniform mechanism for gaining/controlling access to resources, managing multiple resources of the same type, and accessing the individual resource's management state and status.

The terminal may be a DTV receiver, set-top box, IRD, TV-enabled PC, or the like. An application may use a resource, which is usually a device, function or a process on the receiver (e.g., tuner, modem, database, plug-in module, cable, software module, network interface card, persistent storage, TV screen space, memory, CPU, conditional access (CA) module, etc.)

Moreover, individual resources may advertise changes in their state and status according to their capabilities and complexity. Applications which are using these resources may monitor the state and status changes and adjust their own behavior accordingly. Management applications, whose purpose is to monitor the behavior of resources to collect statistics, fine-tune the receiver configuration and/or detect and fix or prevent problems (e.g., resource conflicts, malfunctions, etc.) The management applications may be downloaded or otherwise provided (e.g., locally via a smart card or at the time of manufacture or installation) to all or selected receivers to perform such functions using this API.

The API includes three packages: resource, management and registry. The resource package depends on the registry and management packages.

The API is preferably independent of an operating system and hardware of the terminal.

In a particular implementation, a television set-top terminal is provided that includes a computer readable medium having computer program code means, and means for executing the computer program code means to implement an Application Programming Interface (API) for accessing and managing multiple resources at the terminal. The API provides a resource package for registering the available resources at the terminal, a resource state management package for managing states of the resources, and a registry package for storing objects that represent the resources.

The resource objects, in this context, are software objects as known from the field of object-oriented technology. The objects represent the real resources at the terminal. A ResourceRegistry is a convenient place where an application can learn what types of resources are available, and retrieve a ResourceType Manager for a specific type of resource. Additionally, an application can determine how many, and which, resources are available, and possibly access/use one or more of the available resources.

The management package may manage the states of the resources according to the ITU-T X.731 standard for state management.

The available resources may include a tuner, a modem, a database, a plug-in module, a cable, a software module, a network interface card, and a conditional access module, for example.

The API may provide a resource registry for maintaining a record of resource managers that provide access to individual resources.

The API may be independent of an operating system and hardware of the terminal.

The API may group resources of the same type, and manage the grouped resources as a group.

The API may monitor behavior of the resources, and attach (e.g., associate) corresponding management information to the resources.

The API may enable the resources to advertise their respective states to at least one application at the terminal. The API may also enable the application to access the advertised states of the advertising resources.

The API may enable administrative locking and unlocking of the resources.

The API may enables the resources to advertise respective alarm statuses, availability statuses, procedural statuses, operational states, administrative states, and usage states thereof to applications at the terminal.

A corresponding method is also presented.

DETAILED DESCRIPTION OF THE INVENTION

1. Introduction

The present invention relates to an application programming interface (API) that provides a uniform mechanism for gaining access to resources (ResourceRegistry), managing multiple resources of the same type (ResourceTypeManager) and accessing the individual resource's management state and status (GenericResource and ObjectState).

For example, downloadable applications (e.g., Electronic Program Guide—EPG, stock ticker, etc.) may need to access these resources.

The invention describes a Resource Management API and its relationships to other related packages, specifically the Registry package, and how it can be applied to existing resources such as the Digital Audio Video Council (DAVIC) tuning resource (NetworkInterface).

Note that portions of the disclosure were generated automatically from Rational Rose™ CASE tool, developed by Rational Software Corporation, USA. The figures use the Rational Rose™ depiction of the Unified Modeling Language (UML), which is a language for specifying, constructing, visualizing, and documenting the artifacts of a software-intensive system. A class diagram represents the static structure of a system, and shows a pattern of behaviors that the system exhibits. This is accomplished by showing the existence of classes and their relationships. Each class is represented by a box with three sections. The top section lists the class name. The middle section denotes a list of attributes, and the bottom section denotes a list of operations.

A solid or dashed line between classes denotes an association or dependency. A white diamond tip denotes aggregation by reference, while a black diamond tip denotes aggregation by value. A triangular arrowhead denotes a restricted navigation, e.g., inheritance of operation but not of structure.

Moreover, interfaces and classes begin with an uppercase letter, while methods begin with a lowercase letter.

A class is a template that defines a data structure, method and function calls for an object. An interface defines a set of methods/function calls that can be manipulated by a class. The class provides the code for implementing an interface.

2. Model Description

Figure 1:
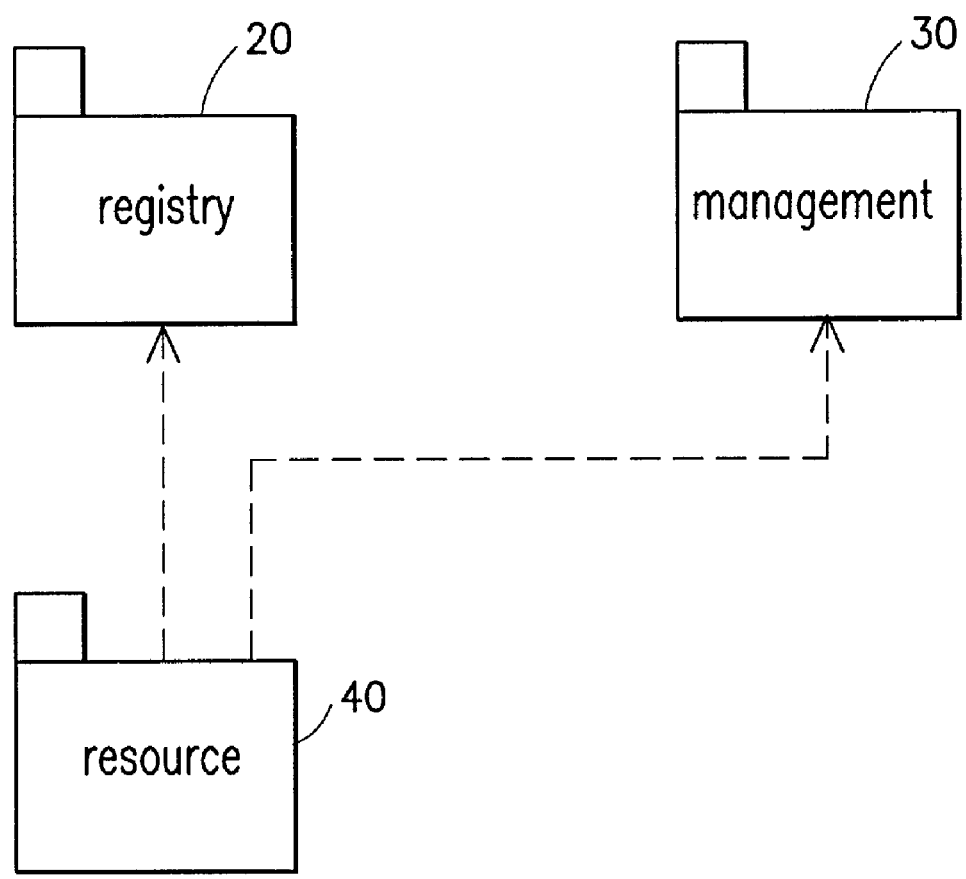
FIG. 1 shows package relationships and dependencies in accordance with the present invention.

FIG. 1 shows package relationships and dependencies in accordance with the present invention. The API includes three packages: resource 40, management 30 and registry 20. The resource package depends on the registry and management packages.

2.1 Resource Package

Figure 2:
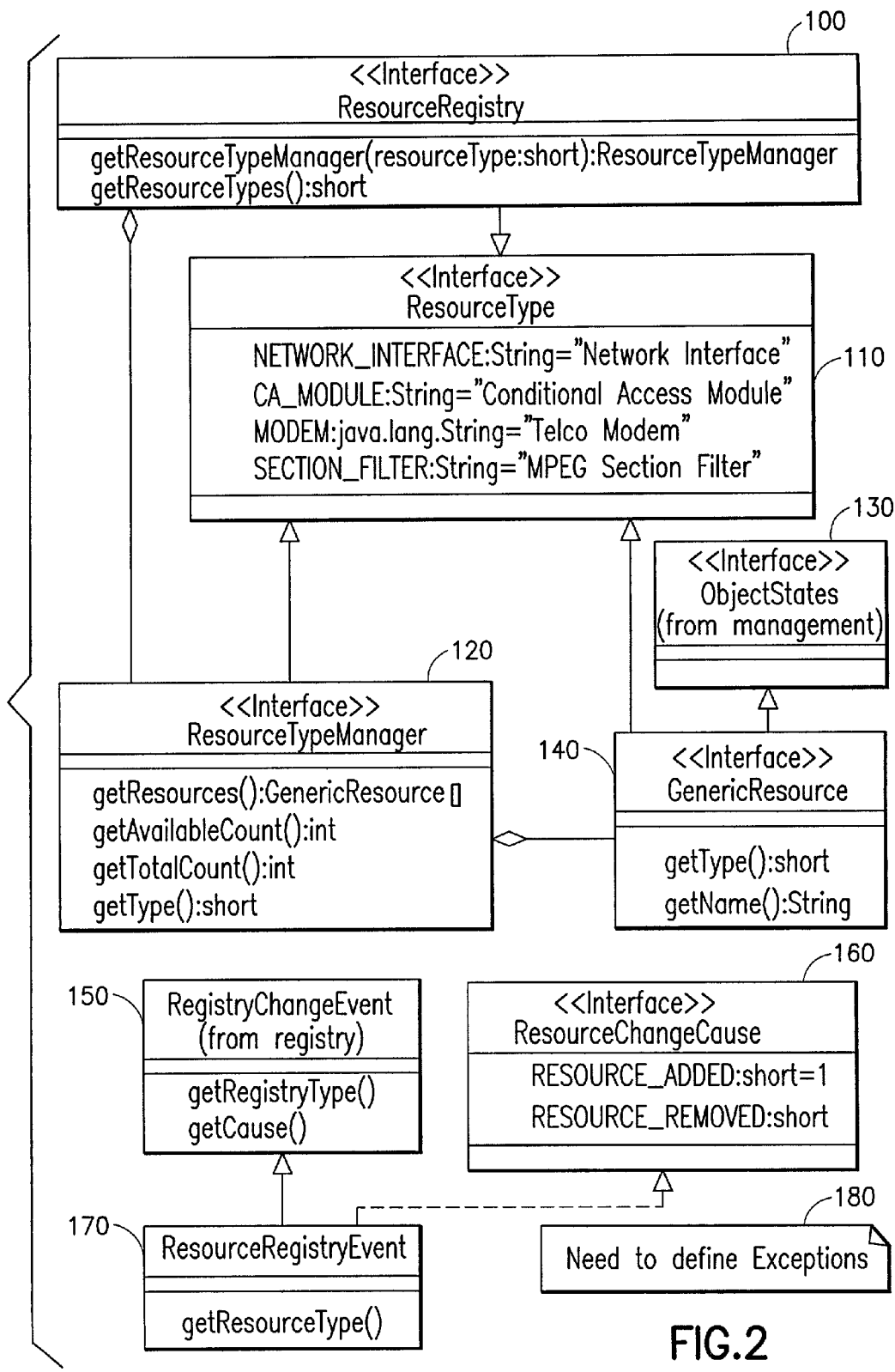
FIG. 2 illustrates a resource package class/interface diagram in accordance with the present invention.

FIG. 2 illustrates a resource package class/interface diagram in accordance with the present invention. The object diagram describes the resource management API of the present invention. A ResourceRegistry 100 is the central registry of all available resources. The ResourceRegistry is the single place where a downloaded application must go to learn about existing resources.

Resources of the same type are managed by a ResourceTypeManager 120. The DAVIC NetworkInterfaceManager is an example of a ResourceTypeManager since there may be more than one NetworkInterface in the DTV receiver. Individual resources implement the GenericResource interface 140, which identifies the name and type of the specific resource and, in turn, implements the ObjectStates interface 130 providing access to all or an appropriate subset of resource states and status information.

A state is accessed to learn the current value of the state.

The Event-Listener model provides a mechanism to inform listeners about changes in the ResourceRegistry 100, such as addition of new resources or their removal from the registry.

As is known, Java defines an Event-Listener pattern which allows objects to register as listeners to another object. If there are any changes with this object, it sends an event to the listening object.

A ResourceType interface 110, RegistryChangeEvent class 150, ResourceChangeCause interface 160, and ResourceRegistryEvent class 170 are also provided.

Exceptions 180 can also be defined. Specifically, the structure is set up so that security can be used to allow some applications to access resources and some other not. If this is desirable, it may be done implicitly (already built into Java), or explicitly by defining new Exceptions.

2.2 Management Package

Figure 3B:
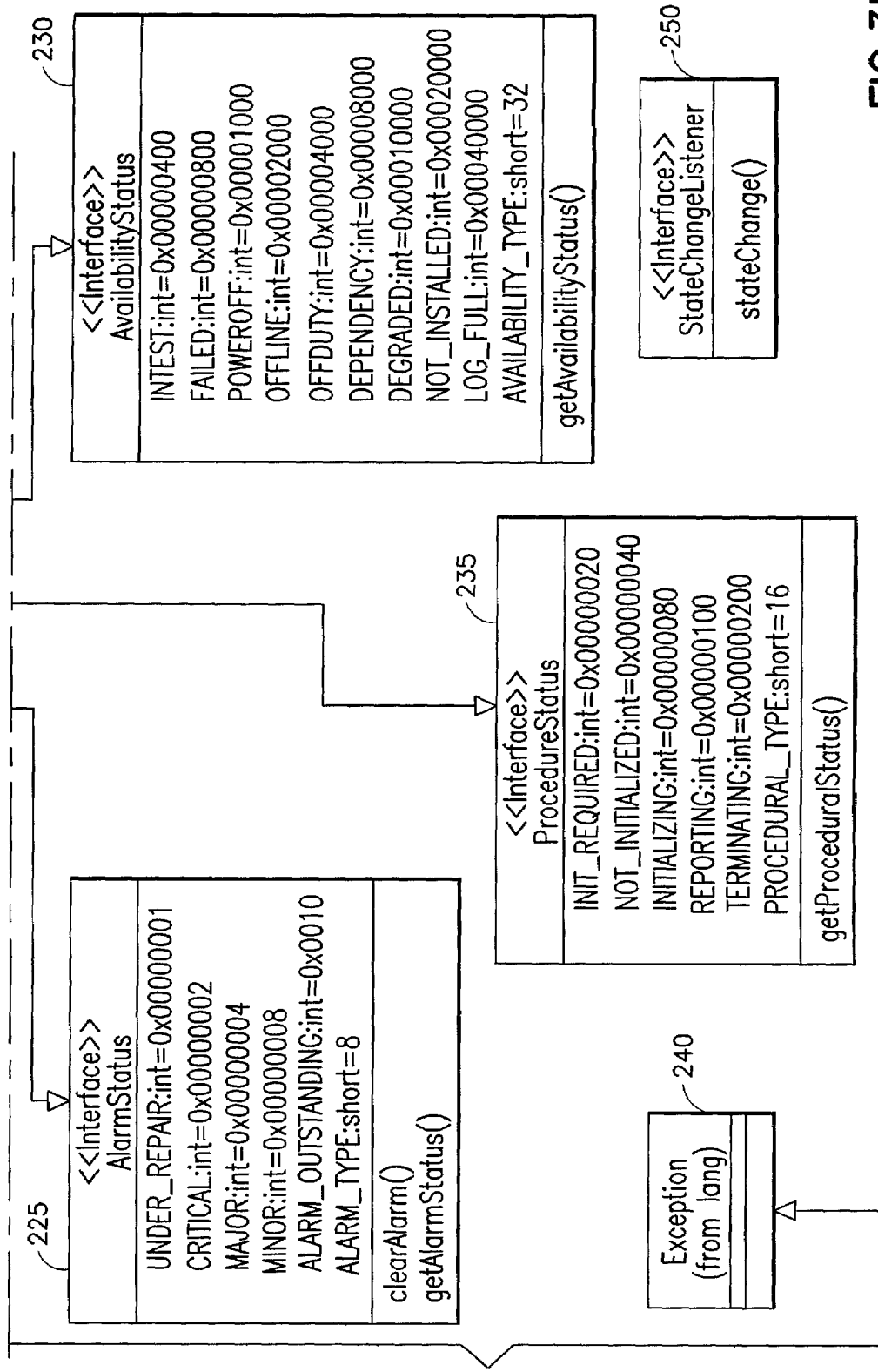
FIG. 3 illustrates a management package class/interface diagram in accordance with the present invention.
Figure 3C:
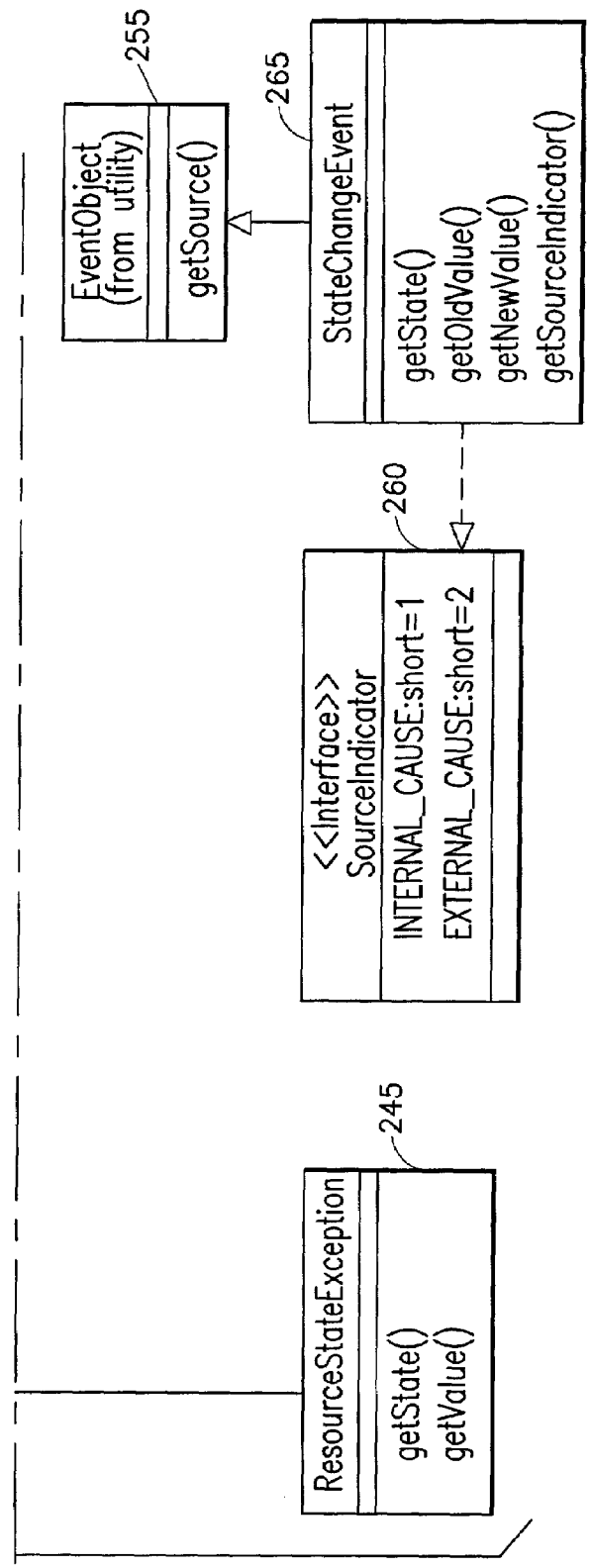

FIG. 3 illustrates a management package class/interface diagram in accordance with the present invention. The diagram describes those classes and interfaces related to state management, specifically managing resource states based on the ITU-T management standard. It is separated into its own package since it can be applied to any manageable object, such as DTV receiver resources, downloadable applications, etc.

The management package includes an AdministrativeState interface 205, an OperationalState interface 210, a UsageState interface 215, an AlarmStatus interface 225, an AvailabilityStatus interface 230, a ProceduralStatus interface 235, an Exception class 240, a ResourceStateException class 245, a StateChangeListener interface 250, an EventObject class 255, a SourceIndicator interface 260, and a StateChangeEvent class 265.

A specific resource is free to support a subset of the defined states and status attributes as appropriate to the specific resource functionality. DigitalTV Application Software Environment (DASE) may mandate a subset of these in order to provide for a better interoperability between applications and resources with respect to management.

2.3 Registry Package

Figure 4:
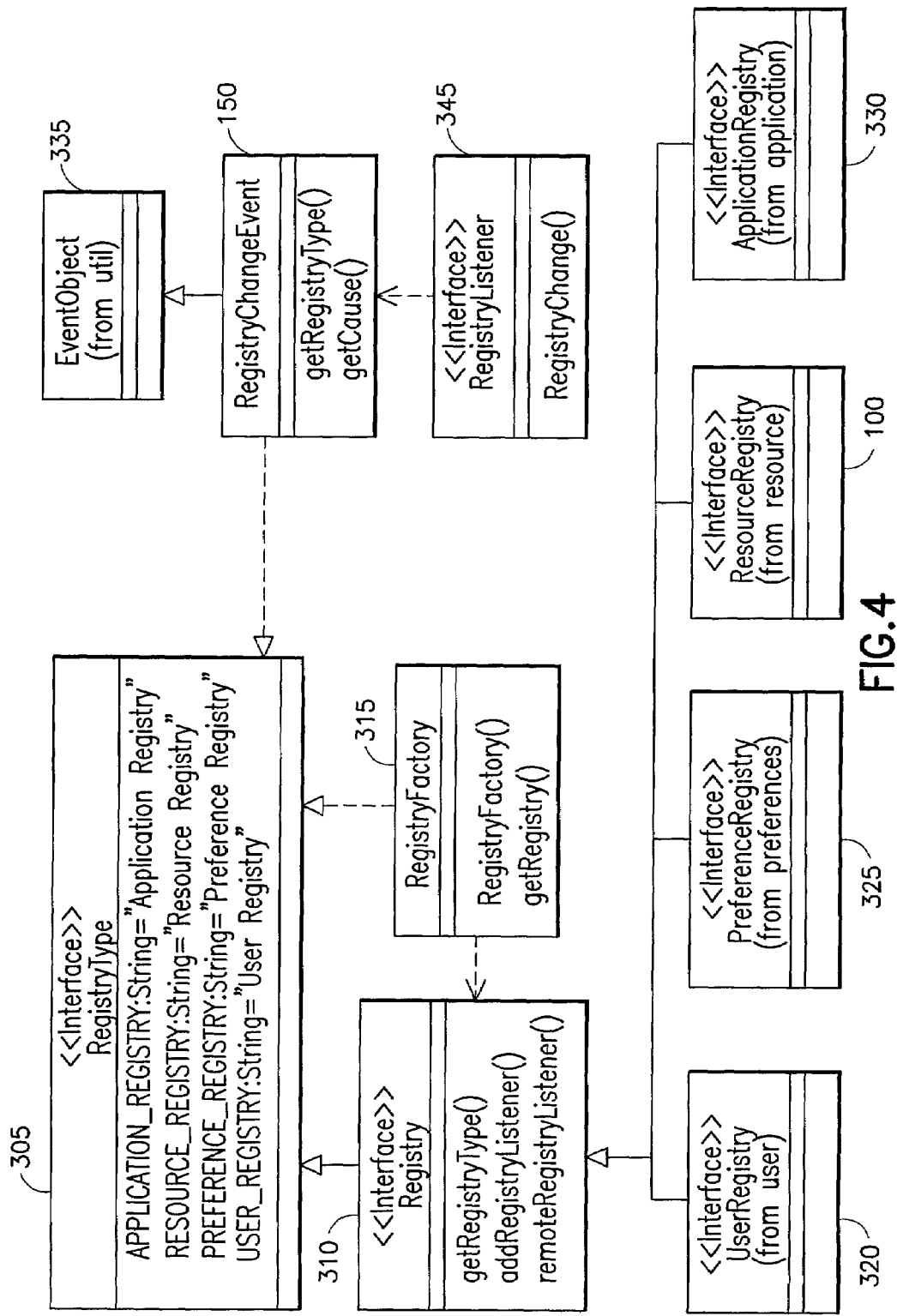
FIG. 4 illustrates a registry package class/interface diagram in accordance with the present invention.

FIG. 4 illustrates a registry package class/interface diagram in accordance with the present invention.

The Registry package provides a basic mechanism to construct a Registry object of any kind. The Registry is a base interface which is extended by all specific Registries, such as the ResourceRegistry 100.

There is a RegistryListener 345 and RegistryChangeEvent 150 associated with this package. The listener interface 345 is used by any object that wants to be notified of any changes in the Registry 310. Changes are considered those that affect the Registry itself (not necessarily the individual elements in the registry), such as adding or removing elements to/from the Registry 310. The RegistryChangeEvent 150 is an abstract class which will be extended by the specific registry events.

Since most of the API is defined in terms of Java Interfaces, the RegistryFactory 315 is a class that hides the actual object construction implementation.

A RegistryType interface 305, UserRegistry interface 320, PreferenceRegistry interface 325, ApplicationRegistry interface 330, and EventObject class 335 are also provided. The Registry object serves as a generic mechanism for registering similar types of objects in the registry. That is, users are registered in a UserRegistry, and user preferences are registered in a PreferenceRegistry, as discussed in commonly-assigned Patent Application No. PCT/US99/23346, filed Oct. 7, 1999 and entitled "Digital Television Receiver with Application Programming Interface For User Management."

Applications are registered in an ApplicationRegistry, discussed in commonly-assigned Patent Application No. PCT/US99/23721, filed Oct. 7, 1999, and entitled "Software Application Lifecycle And Management For Broadcast Applications."

2.4 Tuning Package

Figure 5:
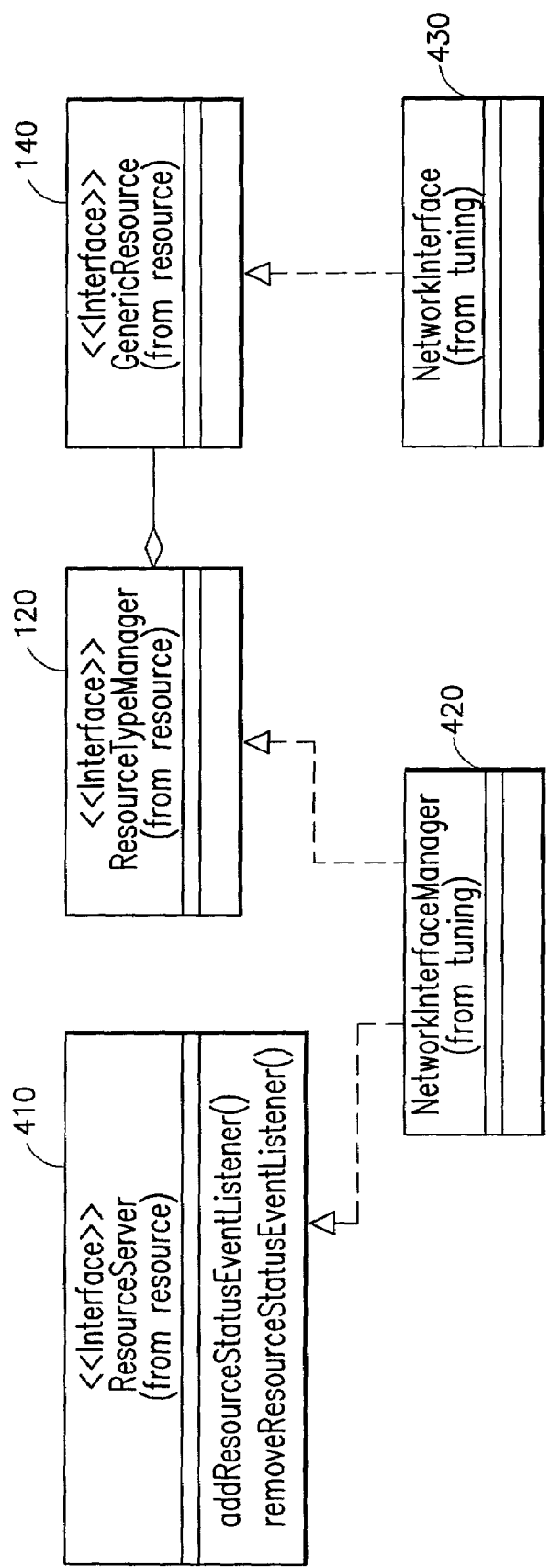
FIG. 5 illustrates an example class/interface diagram that shows how the resource, management and registry packages may be used with a network interface (tuner) in accordance with the present invention.

FIG. 5 illustrates an example class/interface diagram that shows how the resource, management and registry packages may be used with a network interface (tuner) in accordance with the present invention. The diagram shows how the Resource package classes can be applied to already defined resources. Generally, the figure is an example of how the resource, management and registry packages may be used.

This example shows the DAVIC tuning API (org.davic.net.tuning) where the NetworkInterfaceManager 420, which manages multiple NetworkInterfaces 430, can be considered as the generic ResourceTypeManager 120. Classes 420 and 430 are from the DAVIC tuning package. The NetworkInterface 430, which represents the specific resource, can implement the GenericResource interface 140 and, in turn, the ObjectStates interface 130.

A ResourceServer interface 410 is also provided. A ResourceServer is another interface from the DAVIC set of packages. This example shows how the present invention can be applied to an existing resource that is defined by another organization—DAVIC, in this case.

3. Class and Interface Specification

The following sections describe the individual classes, interfaces and their methods.

3.1 Resource Package

This package provides classes and interfaces related to resource management functions.

3.1.1 ResourceRegistry

This interface 100 defines the necessary functionality behind the ResourceRegistry as applicable to an application. It lists resources. For example, a downloadable application may ask the ResourceRegistry what types of resources are available on the terminal, and then get the ResourceTypeManager to request access to a specific resource. ResourceRegistry 100 is derived from ResourceType 110 and Registry 310.

Public Operations:

getResourceTypeManager (resourceType: short): ResourceTypeManager

Returns a Resource Type Manager which manages a collection of resources of the specified type. Returns Null if this type of a resource does not exist.

getResourceTypes ( ): short [ ]

This method returns a list of supported resource types.

Public operations are those methods that may be called and used by other objects since they are visible outside of the object (e.g., class). In contrast, private operations are visible only to the class/interface itself.

3.1.2 ResourceTypeManager

This interface 120 has to be supported by classes representing managers of a certain type of a resource.

It is expected that most ResourceServers from the org.davic.resources package will implement this interface. It is derived from ResourceType 110.

Public Operations:

getResources ( ): GenericResource [ ]

Returns a list of GenericResources managed by this ResourceTypeManager.

getAvailableCount ( ): int

Returns the number of available resources.

getTotalCount ( ): int

Returns the total number of resources managed by this ResourceTypeManager.

getType ( ): short

Returns the type of this resource manager.

3.1.3 GenericResource

This interface 140 represents a Generic Resource which defines a common interface that has to be implemented by every manageable resource.

Only an applicable subset of ObjectStates 130 will be implemented by each specific resource.

The class that represents the actual resource (such as the NetworkInterface 430) or a proxy (such as the DAVIC ResourceProxy) may implement this interface.

It is derived from ObjectStates 130 and ResourceType 110.

Public Operations:

getType ( ): short

Returns the type of this resource.

getName ( ): String

Returns a name of this resource.

3.1.4 ResourceType

This interface defines the different types of resources, such as a network interface card, conditional access (CA) module, modem, etc.

Public Attributes:

NETWORK_INTERFACE: String="Network Interface"

CA_MODULE: String="Conditional Access Module"

MODEM: java.lang.String="Telco Modem"

SECTION_FILTER: String="MPEG Section Filter"

3.1.5 ResourceRegistryEvent

This event 170 informs the RegistryListener 345 that there was a change in the Registry 310. The Event has information about the type of a resource that changed, and the nature of the change (e.g., resource added, removed, etc.).

It may be useful in some implementations to return the ResourceTypeManager 120 of the affected resource.

It is derived from RegistryChangeEvent 150.

Public Operations:

getResourceType ( ): java.lang.String

Returns the type of resource that has changed in the ResourceRegistry 100.

3.1.6 ResourceChangeCause

This interface defines possible causes for the ResourceRegistryEvent 170.

Public Attributes:

RESOURCE_ADDED: short=1

RESOURCE_REMOVED: short

3.2 Management Package

This package includes classes and interfaces related to object management. It can be applied in its entirety or as a subset as relevant to the specific managed entity. It is applicable for managing state and status attributes of digital television (DTV) receiver resources as well as applications.

It is based on the ITU-T X.731 standard for State Management.

3.2.1 AdministrativeState

An interface that defines Masks for different Administrative States:

locked: The resource is administratively prohibited from performing services for its users.

Unlocked: The resource is administratively permitted to perform the services to users.

The unlocked state is independent of its inherent operability. That is, a resource may be locked or unlocked (the Administrative State) and enabled or disabled (the Operational State)—these are independent of each other.

Shutting down: Use of resource is administratively permitted to the existing instances of users only. The manager may at any time cause the object to revert to the Unlocked state.

Public Attributes:

UNLOCKED: int=0x00000001

LOCKED: int=0x00000002

SHUTTING_DOWN: int=0x00000004

ADMIN_TYPE: short=1

Public Operations:

getAdministrativeState ( ): int

Called to get the current value of the Administrative State.

setLock (administrativeState: int): void

Called to change the value of the Administrative State.

3.2.2 OperationalState

This interface 210 defines the Operational state for Resources and Application. Note that this Management API is a generic mechanism that allows any resource or any application to implement the ObjectStates interface to support manageability. In a specific case (e.g., FIG. 5) a NetworkInterface implements the GenericResource interface 140, which in turn implements the ObjectStates interface 130, which has all the methods necessary for a resource to be managed.

Disabled: The resource is totally inoperable and unable to provide the service to the users.

Enabled: The resource is partially operable and available for use.

Public Attributes:

DISABLED: int=0x8

ENABLED: int=0x10

OPERATIONAL_TYPE: short=2

Public Operations:

getOperationalState ( ): int

Called to get the current value of the OperationalState 210.

3.2.3 AlarmStatus

This interface 225 defines all the alarm states.

When the value of this attribute is an empty set, this implies that none of the status conditions described below are present.

under repair: The resource is currently being repaired. When under repair value is present, the operational state is either disabled or enabled.

critical: One or more critical alarms indicating a fault have been detected in the resource, and have not been cleared. The operational state of the managed object can be disabled or enabled.

major: One or more major alarms indicating a fault have been detected in the resource, and have not yet been cleared. The operational state of the managed object can be disabled or enabled.

minor: One or more minor alarms indicating a fault have been detected in the resource, and have not yet been cleared. The operational state of the managed object can be disabled or enabled.

alarm outstanding: One or more alarms have been detected in the resource. The condition may or may not be disabling. If the operational state is enabled, additional attributes, particular to the managed object class, may indicate the nature and cause of the condition and the services that are affected.

The presence of the above alarm state conditions does not suppress the generation of future fault-related notifications.

Public Attributes:

UNDER_REPAIR: int=0x00000001

CRITICAL: int=0x00000002

MAJOR: int=0x00000004

MINOR: int=0x00000008

ALARM_OUTSTANDING: int=0x0010

ALARM_TYPE: short=8

Public Operations:

clearAlarm (alarm: int): void

Called to clear a specific alarm. The controlling process has acted on the alarm.

getAlarmStatus ( ): int

Called to get the current set of values of the Alarm Status.

3.2.4 AvailabilityStatus

This interface 230 defines the Availability status of a resource.

When the value of this attribute is an empty set, this implies that none of the status conditions described below are present.

in test: The resource is undergoing a test procedure. If the administrative state is locked or shutting down then normal users are precluded from using the resource and the control status attribute has the value reserved for test.

Tests that do not exclude additional users can be present in any operational or administrative state but the reserved for test condition should not be present.

failed: The resource has an internal fault that prevents it from operating. The operational state is disabled.

power off: The resource requires power to be applied and is not powered on.

For example, a fuse or other protection device is known to have removed power or a low voltage condition has been detected. The operational state is disabled.

off line: The resource requires a routine operation to be performed to place it online and make it available for use. The operation may be manual or automatic, or both. The operational state is disabled.

off duty: The resource has been made inactive by an internal control process in accordance with a predetermined time schedule. Under normal conditions the control process can be expected to reactivate the resource at some scheduled time, and it is therefore considered to be optional. The operational state is enabled or disabled.

dependency: The resource cannot operate because some other resource on which it depends (e.g., a resource not represented by the same managed object) is unavailable. For example, a device is not accessible because its controller is powered off.

The operational state is disabled.

degraded: The service available from the resource is degraded in some respect, such as in speed or operating capacity. Failure of a test or an unacceptable performance measurement has established that some or all services are not functional or are degraded due to the presence of a defect. However, the resource remains available for service, either because some services are satisfactory or because degraded service is preferable to no service at all. Object specific attributes may be defined to represent further information indicating, for example, which services are not functional and the nature of the degradation. The operational state is enabled.

not installed: The resource represented by the managed object is not present, or is incomplete. For example, a plug-in module is missing, a cable is disconnected or a software module is not loaded. The operational state is disabled.

log full: This indicates a log full condition, the semantics of which are defined in CCITT Rec. X.735 |ISO/IEC 10164-6.

Public Attributes:
INTEST: int=0x00000400
FAILED: int=0x00000800
POWEROFF: int=0x00001000
OFFLINE: int=0x00002000
OFFDUTY: int=0x00004000
DEPENDENCY: int=0x00008000
DEGRADED: int=0x00010000
NOT_INSTALLED: int=0x00020000
LOG_FULL: int=0x00040000
AVAILABILITY_TYPE: short=32
Public Operations:
getAvailabilityStatus ( ): int
Called to get the current set of values of the AvailabilityStatus 230.

3.2.5 ProceduralStatus

This interface 235 defines the Procedural status.

The procedural status attribute is supported only by those classes of managed objects that represent some procedure (e.g., a test process) which progresses through a sequence of phases. Depending upon the managed object class definition, the procedure may be required to reach certain phase for the resource to be operational and available for use (i.e., for the managed object to be enabled). Not all phases may be applicable to every class of managed object. If the value of this attribute is an empty set, the managed object is ready, for example, the initialization is complete.

When the value of this attribute is an empty set, this implies that none of the status conditions described below are present.

initialization required: The resource requires initialization to be invoked by the manager (e.g., ResourceTypeManager 120) before it can perform its normal functions, and this procedure has not been initiated. The manager may be able to invoke such initialization through an action. The terminating condition may also be present. The operational state is disabled.

not initialized: The resource requires initialization before it can perform its normal functions, and this procedure has not been initiated. The resource initializes itself autonomously, but the operational state may be either disabled or enabled, depending upon the managed object class definition.

initializing: The resource requires initialization before it can perform its normal functions, and this procedure has been initiated but is not yet complete. When this condition is present, the initialization required condition is absent, since initialization has already begun. The operational state may be disabled or enabled, depending upon the managed object class definition.

reporting: The resource has completed some processing operation and is notifying the results of the operation, e.g., a test process is sending its results. The operational state is enabled.

terminating: The resource is in a termination phase. If the resource does not reinitialize itself autonomously, the initialization required condition is also present and the operational state is disabled. Otherwise, the operational state may be either disabled or enabled, depending upon the managed object class definition.

Public Attributes:
INIT_REQUIRED: int=0x00000020
NOT_INITIALIZED: int=0x00000040
INITIALIZING: int=0x00000080
REPORTING: int=0x00000100
TERMINATING: int=0x00000200
PROCEDURAL_TYPE: short=16
Public Operations:
getProceduralStatus ( ): int
Called to get the current set of values of the Procedural Status.

3.2.6 UsageState

This interface 215 defines the Mask (i.e., the bit assignment shown below for IDLE, ACTIVE, etc.) for UsageState, which is the name of the interface which represents the concept of Usage State from the ITU-T X.731 standard.

Idle: The resource is not currently in use.

Active: The resource is in use, but has spare operating capacity to provide additional users at this instant.

Busy: The resource is in use, but has no spare operating capacity to provide additional users at this instant.

Public Attributes:
IDLE: int=0x00000020
ACTIVE: int=0x00000040
BUSY: int=0x00000080
USAGE_TYPE short=4
Public Operations:
getUsageState ( ): int
Called to get the current value of the Usage State.

3.2.7 ObjectStates

This interface 130 allows objects, which are meant to be managed in a standard way, to implement a unified interface which supports all or a suitable subset of states and status values. The defined state and status attributes are specified by the ITU-T standard X.731 for State Management.

It is derived from AlarmStatus 225, ProceduralStatus 235, AvailabilityStatus 230, UsageState 215, OperationalState 210, and AdministrativeState 205.

Public Operations:
getStatesSupported ( ): short [ ]
Called to determine which state and status attributes are supported by the class implementing this interface.

addStateChangeListener (listener: StateChangeListener): void
Called to register a StateChangeListener for StateChangeEvents.

removeStateChangeListener (listener: StateChangeListener): void
   Called to deregister a StateChangeListener.
getCurrentState ( ): int
   Called to get the current value of all supported states. Returns a bit mask representing the individual states.
getCurrentStatus ( ): int
   Called to get the current value of all supported status attributes. Returns a bit mask representing the individual status attributes.

3.2.8 StateChangeListener

This interface 250 must be implemented by classes interested in being notified of state changes of objects which implement the ObjectStates interface 130. If an object which is a StateChangeListener 250 registers via the addStateChangeListener method, it will be notified by calling the statechange method which includes the appropriate StateChangeEvent 265.
   Public Operations:
   statechange (event: StateChangeEvent): void
      Called to notify a StateChangeListener about a state change. The event parameter provides information about what state has changed.

3.2.9 ResourceStateException

A base Exception class 245 related to the ObjectStates 130 interface. This exception, or its extensions, are thrown when a invalid state change would be caused by a method call. For example, an object in a Disabled state cannot perform a certain operation unless it is Unlocked. Derived from the Exception class 240.
   Public Operations:
   getState ( ): short
      Called to determine which state consistency has been violated.
   getValue ( ): int
      Called to get the current value of the violated state.

3.2.10 StateChangeEvent

This Event 265 is fired (e.g., emitted or sent) when a state changes its value. It is distributed to all registered StateChangeListeners 250.
   Derived from EventObject 255.
   Public Operations:
   getState ( ): short
      Called to determine which state has changed.
   getOldValue ( ): int
      Called to determine the original value of the state.
   getNewValue ( ): int
      Called to determine the new value of the state.
   getSourceIndicator ( ): short
      Called to determine the cause of the event.

3.2.11 SourceIndicator
   Public Attributes:
   INTERNAL_CAUSE: short=1
      State change caused by an internal activity.
   EXTERNAL_CAUSE: short=2
      State change caused by an external activity.

3.3 Registry Package

This package provides a set of supporting and utility classes and interfaces used by other packages.

3.3.1 Registry

This interface 310 provides a common root to all specialized registry interfaces, such ApplicationRegistry 330, ResourceRegistry 100, etc. (FIG. 4). It is provided so that the RegistryFactory 315 can return a base type.

A "base type" is known from the field of object-oriented programming. To illustrate, one can define a class with a set of functions (methods) and internal variables (e.g., a class "Fruit" which represents fruit and its basic characteristics). One can specialize it by defining a new class, "Apple", which inherits everything from the class "Fruit", and adds new functions that are applicable only to Apples but not to Fruit in general. "Fruit" is then referred to as a "base class" or a "base type."
   Derived from RegistryType 305.
   Public Operations:
   getRegistryType ( ): String
      Called to determine the type of registry implemented by the object returned by the RegistryFactory's method getRegistry( ).
   addRegistryListener (listener: org.atsc.registry.RegistryListener): void
      Called to register for events generated by the Registry 310.
   removeRegistryListener (listener: org.atsc.registry.RegistryListener): void
      Called to deregister for events generated by the Registry 310.

3.3.2 RegistryFactory

This class 315 provides a mechanism to create objects that implement specific Registry interfaces, such as the ApplicationRegistry 330. This class is modeled after the Factory Method design pattern, which, as is known from the field of object-oriented programming, is a methodology and structure for solving a problem.
   Public Operations:
   RegistryFactory ( ):
   Constructor:
   getRegistry (registryName: String): org.atsc.registry.Registry
      Returns an instance of an object which implements the specified registry interface. Returns null when specified registry does not exist or cannot be created. The type of the returned object will be one of the derived Registry types, such as the ApplicationRegistry 330.

As known from the field of object-oriented programming, a constructor is a method that is called for each object at the time it is created/instantiated.

3.3.3 RegistryType

This interface 305 defines names for different registry types, such as an application registry (e.g., ApplicationRegistry 330), etc.
   Public Attributes:
   APPLICATION_REGISTRY: String="Application Registry"
   RESOURCE_REGISTRY: String="Resource Registry"
   PREFERENCE_REGISTRY: String="Preference Registry"
   USER_REGISTRY: String="User Registry"

3.3.4 RegistryListener

This interface 345 allows an object to listen to changes made to the Registry 310.
   Public Operations:
   registryChange ( ): ApplicationRegistryEvent
      This method of all registered ApplicationRegistryListeners (e.g., RegistryListener 345) is called by the ApplicationRegistry object 330 when an ApplicationRegistryEvent is fired.

3.3.5 RegistryChangeEvent

This a generic registry change event 150 which is extended by all specific registries (such as ApplicationRegistry 330, etc.) to provide specific information about the change. It is derived from EventObject 335.

Public Operations:

getRegistryType ( ): java.lang.String

Returns the type of a registry that this event is associated with.

getCause ( ): short

Returns the cause of the RegistryChangeEvent 150. Each derived event will define a set of causes appropriate for the registry it represents.

Totals

4 Logical Packages

23 Classes

Accordingly, it can be seen that the present invention provides an application programming interface (API) for a television terminal that provides a uniform mechanism for gaining/controlling access to resources, managing multiple resources of the same type, and accessing the individual resource's management state and status as defined by the X.731 ITU-T standard. The invention is suitable for use in managing resources in a Digital Television (DTV) Receiver/Terminal.

Although the invention has been described in connection with various specific embodiments, those skilled in the art will appreciate that numerous adaptations and modifications may be made thereto without departing from the spirit and scope of the invention as set forth in the claims.

For example, while various syntax elements have been discussed herein, note that they are examples only, and any syntax may be used.

Moreover, the invention is suitable for use with virtually any type of network, including cable or satellite television broadband communication networks, local area networks (LANs), metropolitan area networks (MANs), wide area networks (WANs), internets, intranets, and the Internet, or combinations thereof.

Additionally, known computer hardware, firmware and/or software techniques may be used to implement the invention.

What is claimed is:

1. A television set-top terminal, comprising:
a computer readable medium having computer program code means; and means for executing said computer program code means to implement an Application Programming Interface (API) for accessing and managing multiple resources at the terminal, wherein:
the API provides a resource package for registering the available resources at the terminal, a management package for managing states of the resources, and a registry package for storing objects that represent the resources.

2. The terminal of claim 1, wherein:
the management package manages the states of the resources according to an ITU-T X.731 standard for state management.

3. The terminal of claim 1, wherein the available resources include at least one of:
a tuner, a modem, a database, a plug-in module, a cable, a software Module, a network interface card, and a conditional access module.

4. The terminal of claim 1, wherein the API provides a resource registry for maintaining a record of resource managers that provide access to individual resources.

5. The terminal of claim 1, wherein:
the API is independent of an operating system and hardware of the terminal.

6. The terminal of claim 1, wherein:
the API groups resources of the same type, and manages the grouped resources as a group.

7. The terminal of claim 1, wherein:
the API monitors behavior of the resources, and attaches corresponding management information to the resources.

8. The terminal of claim 1, wherein:
said API enables the resources to advertise their respective states to at least one application at the terminal.

9. The terminal of claim 8, wherein:
said API enables the application to access the advertised states of the advertising resources.

10. The terminal of claim 1, wherein:
said API enables administrative locking and unlocking of the resources.

11. The terminal of claim 1, wherein:
said API enables the resources to advertise respective alarm statuses thereof to at least one application at the terminal.

12. The terminal of claim 1, wherein:
said API enables the resources to advertise respective availability statuses thereof to at least one application at the terminal.

13. The terminal of claim 1, wherein:
said API enables the resources to advertise respective procedural statuses thereof to at least one application at the terminal.

14. The terminal of claim 1, wherein:
said API enables the resources to advertise respective operational states thereof to at least one application at the terminal.

15. The terminal of claim 1, wherein:
said API enables the resources to advertise respective administrative states thereof to at least one application at the terminal.

16. The terminal of claim 1, wherein:
said API enables the resources to advertise respective usage states thereof to at least one application at the terminal.

17. The terminal of claim 1, wherein:
The resources are used for downloadable applications at the terminal.

18. The terminal of claim 1, wherein the applications include at least one of:
video on demand (VOD), audio on demand, pay-per-view, interactive shopping, electronic commerce, electronic program guides, Internet browsers, telephony services, stock ticker, weather data, travel information, games, gambling, banking, shopping, voting, and mail services, where said mail services include at least one of: text e-mail, voice mail, audio mail, and video mail.

19. The terminal of claim 1, wherein:
The applications enable at least one of Internet connectivity and Internet-based telephony.

20. A method for implementing a software architecture for a television set-top terminal, comprising the steps of:
providing a computer readable medium having computer program code means; and
executing said computer program code means to implement an Application Programming Interface (API) for accessing and managing multiple resources at the terminal; wherein:
the API provides a resource package for registering the available resources at the terminal, a management package for managing states of the resources, and a registry package for storing objects that represent the resources.

* * * * *

UNITED STATES PATENT AND TRADEMARK OFFICE
CERTIFICATE OF CORRECTION

PATENT NO. : 7,487,534 B2
APPLICATION NO. : 09/830754
DATED : February 3, 2009
INVENTOR(S) : Peterka et al.

It is certified that error appears in the above-identified patent and that said Letters Patent is hereby corrected as shown below:

ON THE TITLE PAGE:

--In Item (54), in Title, Column 1, Line 3, after "IN", insert --A--

ON THE TITLE PAGE:

--On Page 2, in Item (56), under "OTHER PUBLICATIONS", in Column 2, Line 1, delete "ammendment" and insert --amendment--

--In Column 1, Line 3, in Title, after "IN", insert --A--

--In Column 13, Line 57, in Claim 3, please delete "Module," and insert --module,--

Signed and Sealed this

Fifteenth Day of September, 2009

David J. Kappos
*Director of the United States Patent and Trademark Office*